United States Patent
Uchiyama et al.

(10) Patent No.: US 8,223,618 B2
(45) Date of Patent: Jul. 17, 2012

(54) OPTICAL INFORMATION RECORDING MEDIUM CAPABLE OF CHANGING THE LIGHT ABSORPTION AMOUNT

(75) Inventors: Hiroshi Uchiyama, Miyagi (JP); Yusuke Suzuki, Miyagi (JP); Takao Kudo, Miyagi (JP); Katsumi Miura, Miyagi (JP)

(73) Assignee: Sony Corporation, Tokyo (JP)

( * ) Notice: Subject to any disclaimer, the term of this patent is extended or adjusted under 35 U.S.C. 154(b) by 382 days.

(21) Appl. No.: 12/686,604

(22) Filed: Jan. 13, 2010

(65) Prior Publication Data
US 2010/0182896 A1 Jul. 22, 2010

(30) Foreign Application Priority Data
Jan. 19, 2009 (JP) ................. P2009-009218

(51) Int. Cl.
*G11B 7/24* (2006.01)

(52) U.S. Cl. ............... 369/275.1; 428/64.1; 430/321

(58) Field of Classification Search ............ 369/275.1, 369/275.2, 275.3, 275.4, 275.5, 180, 281, 369/283, 284, 285, 286, 287, 288; 428/64.1, 428/64.2, 64.4; 430/321, 320, 270.1, 270.11, 430/270.13; 720/718
See application file for complete search history.

(56) References Cited

U.S. PATENT DOCUMENTS

| | | | |
|---|---|---|---|
| 7,778,145 B2 * | 8/2010 | Horie et al. | 369/275.1 |
| 2006/0067202 A1 * | 3/2006 | Yashiro | 369/275.1 |
| 2007/0184386 A1 * | 8/2007 | Miyazawa et al. | 430/270.16 |
| 2009/0269540 A1 * | 10/2009 | Horie et al. | 428/64.4 |

FOREIGN PATENT DOCUMENTS

| | | |
|---|---|---|
| JP | 11-254827 A | 9/1999 |
| JP | 2002-329316 A | 11/2002 |
| JP | 2004-111011 A | 4/2004 |
| JP | 2005-037658 | 2/2005 |
| JP | 2008-071433 | 3/2008 |
| JP | 2008-135144 A | 6/2008 |
| JP | 2008-287754 A | 11/2008 |
| JP | 2010-015631 A | 1/2010 |
| JP | 2010-015632 A | 1/2010 |

\* cited by examiner

*Primary Examiner* — Tan X Dinh
(74) *Attorney, Agent, or Firm* — Wolf, Greenfield & Sacks, P.C.

(57) ABSTRACT

An optical information recording medium includes a recording layer that includes a mark layer in which recording marks formed in accordance with condensed recording light are aligned and has a recording light absorption amount of 20.8% or less with respect to an innermost depth as a depth of the mark layer from a side thereof that the recording light enters to a side thereof that is most distant from the side that the recording light enters, and a change amount of a light absorption amount with respect to measurement light having a wavelength 10 nm shorter than that of the recording light at a time a light absorption amount with respect to measurement light having the same wavelength as the recording light is used as a reference, of 8.0% or more per 0.30 mm.

8 Claims, 12 Drawing Sheets

Mark layers in recording layer

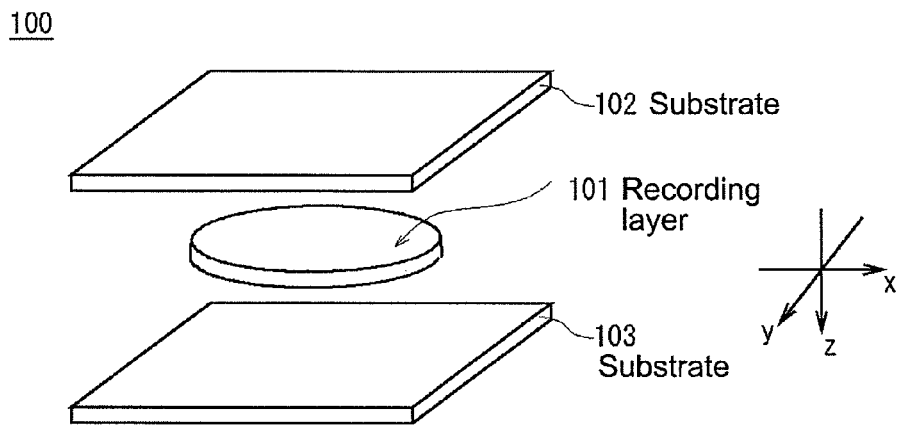
FIG.1A Perspective view
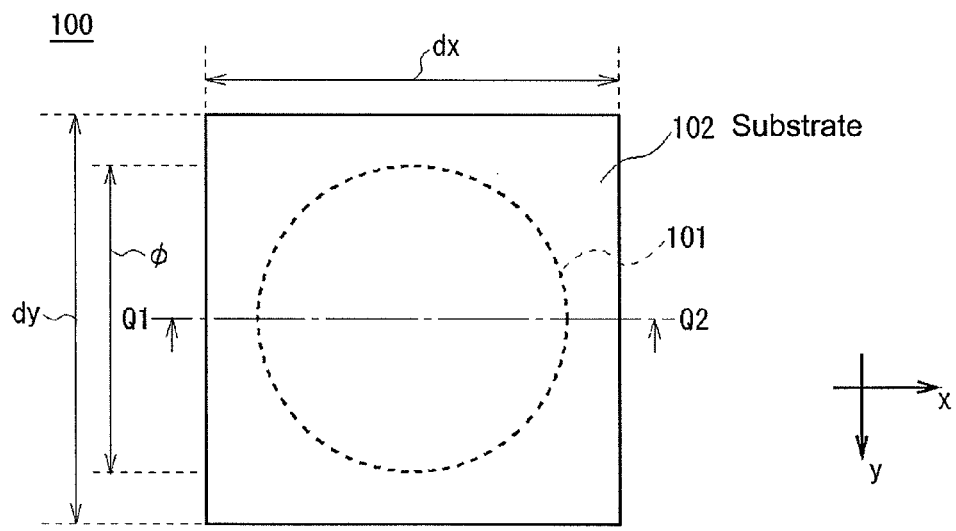
FIG.1B Top view
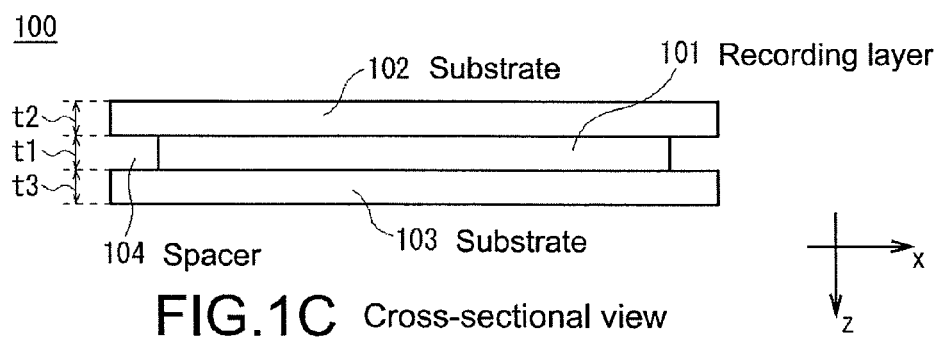
FIG.1C Cross-sectional view
Structure of optical information recording medium Initialization of optical information recording medium State of vaporizing material Irradiation of light beam Mark layers in recording layer Structure of optical information recording/reproducing apparatus Detection of return light beam (sample S1)

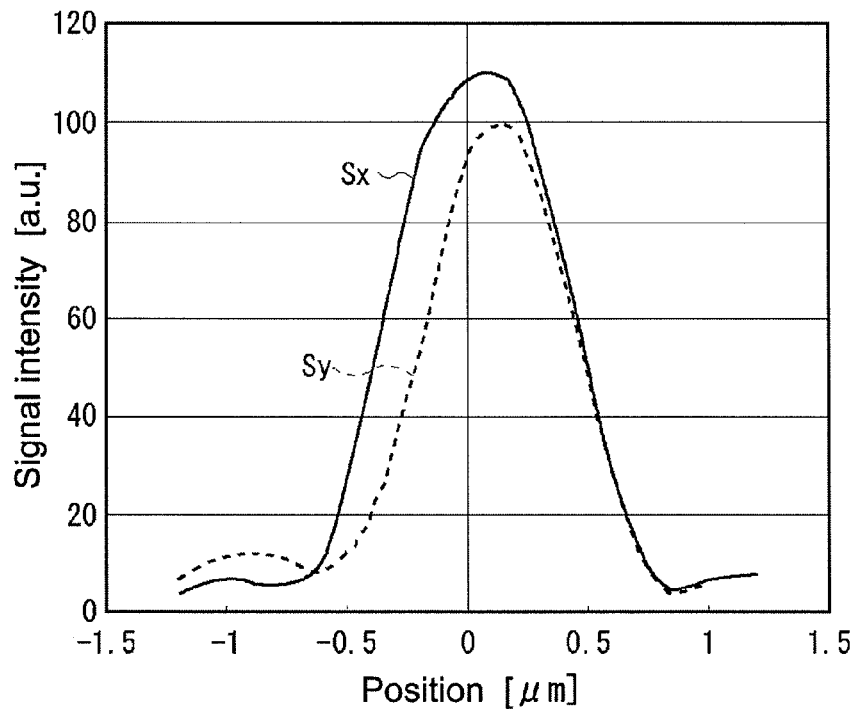
FIG.8A  Horizontal direction
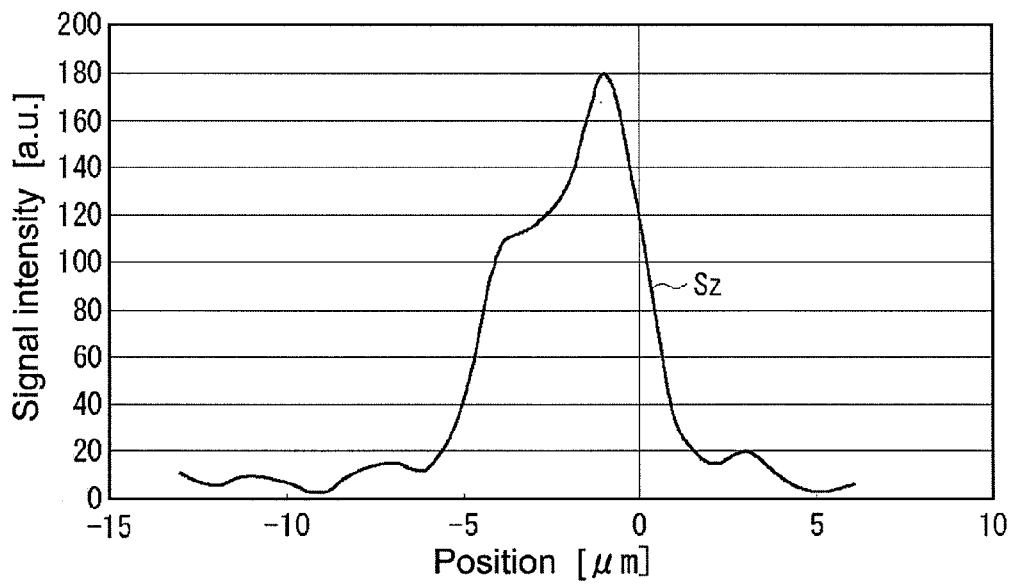
FIG.8B  Vertical direction
Signal intensity distribution of return light Photograph of cross section of recording marks

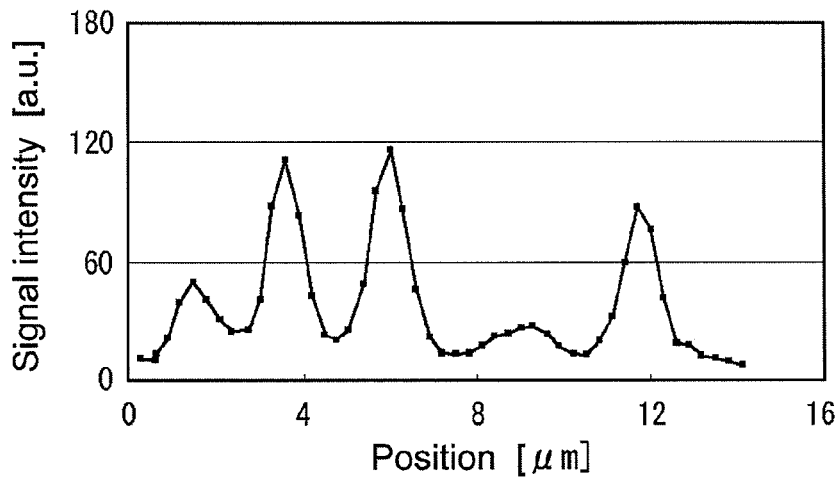
FIG.10A  Second layer
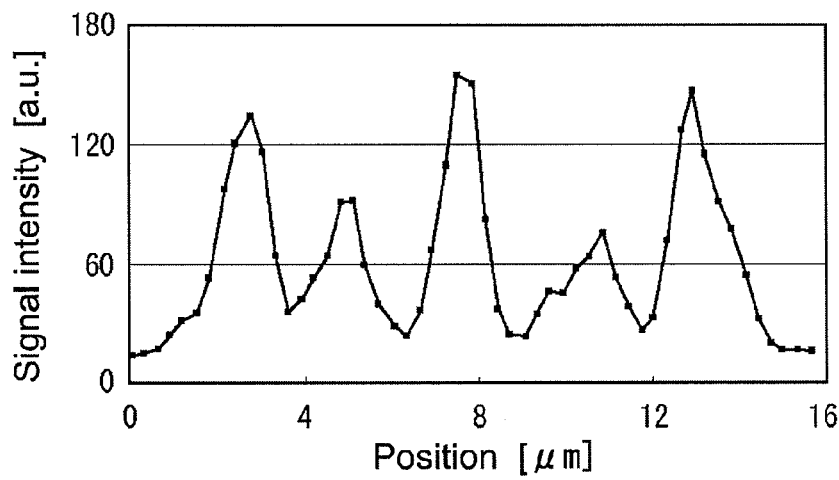
FIG.10B  Fifth layer
Signal intensity distribution of return light in each layer (1)

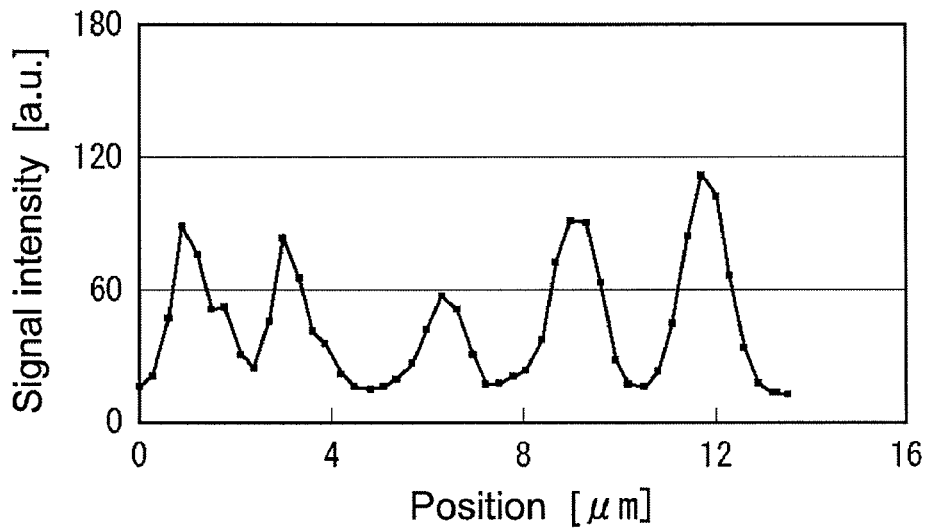
FIG.11A  Eighth layer
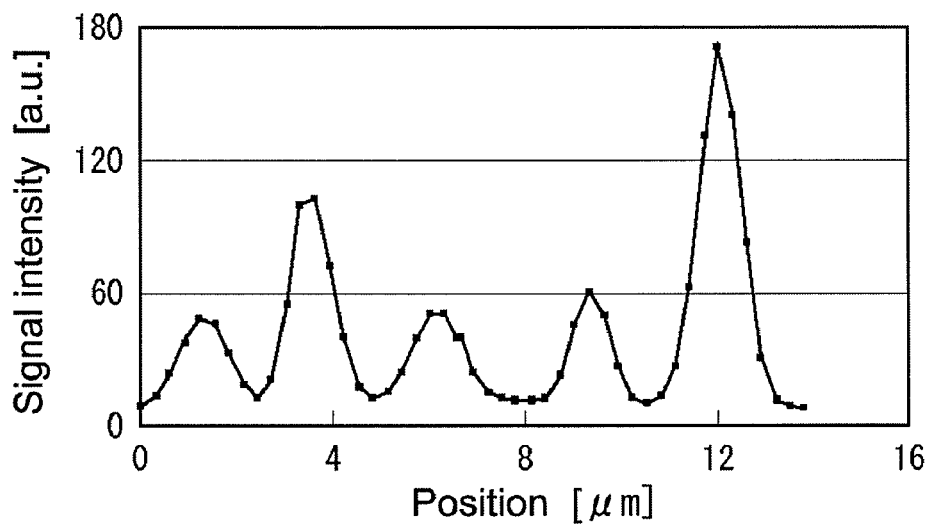
FIG.11B  Eleventh layer
Signal intensity distribution of return light in each layer  (2)

Measurement of vaporization temperature

Relationship between recording light absorption amount and short-wavelength absorption change amount

OPTICAL INFORMATION RECORDING MEDIUM CAPABLE OF CHANGING THE LIGHT ABSORPTION AMOUNT

BACKGROUND OF THE INVENTION

1. Field of the Invention

The present invention relates to an optical information recording medium onto/from which information is recorded/reproduced using, for example, light beams.

2. Description of the Related Art

From the past, disc-like optical information recording media generally typified by a CD (Compact Disc), a DVD (Digital Versatile Disc), and a BD (Blu-ray Disc; registered trademark) have been widely used as optical information recording media.

Meanwhile, in optical information recording/reproducing apparatuses that support the optical information recording media, various types of information including various contents such as music contents and video contents and various types of data for computers are recorded onto the optical information recording media. Particularly in recent years, an information amount is increasing due to high-definition videos and high-quality-sound music, and there is a demand to increase the number of contents that can be recorded onto a single optical information recording medium. Thus, capacities of the optical information recording media are required to be additionally increased.

In this regard, as a technique of increasing a capacity of an optical information recording medium, there is proposed an optical information recording medium in which a plurality of minute holograms as recording marks formed by interferences of two types of light beams are formed in a thickness direction of the optical information recording medium so as to overlap one another. In this optical information recording medium, information corresponding to a plurality of layers are recorded within a single recording layer (see, for example, Japanese Patent Application Laid-open No. 2008-71433; hereinafter, referred to as Patent Document 1).

The optical information recording medium disclosed in Patent Document 1 has a disadvantage that an optical system thereof becomes complex since it needs two types of light beams. On the other hand, as the optical information recording medium, there is also proposed an optical information recording medium onto which, by heat generated by irradiation of one type of light beams, cavities (bubbles) are formed in the vicinity of a focal point of the light beams and information corresponding to a plurality of layers is recorded within a single recording layer by using the cavities as recording marks (see, for example, Japanese Patent Application Laid-open No. 2005-37658; hereinafter, referred to as Patent Document 2).

SUMMARY OF THE INVENTION

The optical information recording medium of Patent Document 2, however, requires a pulse laser with high peak power. Thus, it is difficult to practically use the medium as a drive. Moreover, in a case of simply using a continuous wave laser, a point that a high transmittance is required due to a multilayer structure and a point that a high absorptivity is required in the vicinity of the focal point contradict each other. Therefore, in the optical information recording medium, it has been difficult to largely increase the absorptivity in the vicinity of the focal point and it has also been necessary to irradiate the light beams for a long period of time for forming recording marks.

In view of the above circumstances, there is a need for an optical information recording medium capable of improving a recording speed.

According to an embodiment of the present invention, there is provided an optical information recording medium including a recording layer that includes a mark layer in which recording marks formed in accordance with condensed recording light are aligned and has a recording light absorption amount of 20.8% or less with respect to an innermost depth as a depth of the mark layer from a side thereof that the recording light enters to a side thereof that is most distant from the side that the recording light enters, and a change amount of a light absorption amount with respect to measurement light having a wavelength 10 nm shorter than that of the recording light at a time a light absorption amount with respect to measurement light having the same wavelength as the recording light is used as a reference, of 8.0% or more per 0.30 mm.

With this structure, the optical information recording medium can readily increase a temperature in the vicinity of the focal point by efficiently absorbing the recording light as well as suppress the recording light to be absorbed in an area other than the area in the vicinity of the focal point so that the recording light with a high optical intensity is irradiated onto the area in the vicinity of the focal point. As a result, the recording marks can be formed in a short period of time.

According to an embodiment of the present invention, there is provided an optical information recording medium including a recording layer that includes a mark layer in which recording marks formed in accordance with condensed recording light are aligned and has a recording light absorption amount of 20.8% or less with respect to an innermost depth as a depth of the mark layer from a side thereof that the recording light enters to a side thereof that is most distant from the side that the recording light enters, the recording layer having an absorption end for rapidly increasing a light absorption amount from a long-wavelength side to a short-wavelength side within ranges of +5 nm and −20 nm from a wavelength of the recording light.

With this structure, the optical information recording medium can readily increase the temperature in the vicinity of the focal point by efficiently absorbing the recording light as well as suppress the recording light to be absorbed in the area other than the area in the vicinity of the focal point so that the recording light with a high optical intensity is irradiated onto the area in the vicinity of the focal point. As a result, the recording marks can be formed in a short period of time.

According to the embodiments of the present invention, it is possible to readily increase the temperature in the vicinity of the focal point by efficiently absorbing the recording light as well as suppress the recording light to be absorbed in the area other than the area in the vicinity of the focal point so that the recording light with a high optical intensity is irradiated onto the area in the vicinity of the focal point. As a result, the recording marks can be formed in a short period of time. Thus, according to the embodiments of the present invention, an optical information recording medium capable of increasing a recording speed can be realized.

These and other objects, features and advantages of the present invention will become more apparent in light of the following detailed description of best mode embodiments thereof, as illustrated in the accompanying drawings.

BRIEF DESCRIPTION OF DRAWINGS

FIG. 1 are schematic diagrams showing a structure of an optical information recording medium;

FIG. 8 are schematic diagrams showing a signal intensity distribution of return light;

FIG. 10 are schematic diagrams showing a signal intensity distribution (1) of return light in each layer;

FIG. 11 are schematic diagrams showing a signal intensity distribution (2) of return light in each layer;

DESCRIPTION OF PREFERRED EMBODIMENTS

Figure 2:
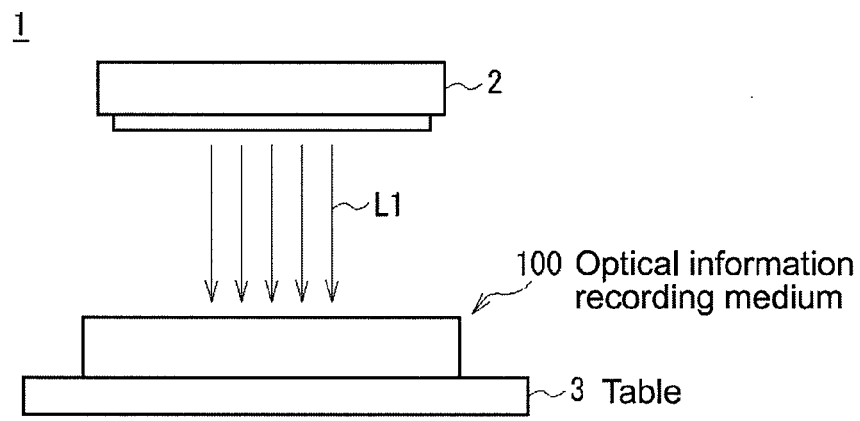
FIG. 2 is a schematic diagram for explaining an initialization of the optical information recording medium.

Hereinafter, embodiments of the present invention will be described with reference to the drawings.

1. to 4. Embodiment (relationship between recording light absorption amount and short-wavelength absorption change amount)

5. Other embodiments

Embodiment

1. Structure of Optical Information Recording Medium

As shown in FIGS. 1A to 1C, by forming a recording layer 101 between substrates 102 and 103, an optical information recording medium 100 is imparted a function as a medium onto which information is recorded as a whole. A shape of the optical information recording medium 100 is not particularly limited. Instead of the rectangular-plate shape as shown in FIG. 1, it is also possible for the optical information recording medium 100 to take a form of a disc as in the case of a general optical disc such as a BD (Blu-ray Disc; registered trademark) and a DVD (Digital Versatile Disc) and form a chucking hole at a center portion.

The substrates 102 and 103 are formed of various optical materials such as a glass substrate, an acrylic resin, and a polycarbonate resin and structured to transmit light at a high rate. Moreover, the substrates 102 and 103 are formed in a shape of a square plate, a rectangular plate, or a disc that has a length dx in an x direction and a length dy in a y direction of about 50 mm to 150 mm and thicknesses t2 and t3 of about 0.05 mm to 1.2 mm.

The recording layer 101 is 0.05 mm or more and 1.2 mm or less, more desirably 1.0 mm or less. If the recording layer 101 is made thin, a large number of recording marks RM cannot be aligned in a thickness direction of the recording layer 101, and a storage capacity as the optical information recording medium 100 cannot be increased, which is undesirable. Further, if the recording layer 101 exceeds 1.2 mm, an overall transmittance of the recording layer 101 is lowered to thus lower an optical intensity of light beams irradiated on a rear side, which is undesirable.

A sum of the thicknesses of the substrate 102 and the recording layer 101 through which light passes is desirably 1.2 mm or less. This is because, if the sum of the thicknesses exceeds 1.2 mm, astigmatism of recording light beams (hereinafter, referred to as recording light beams L2c) caused in the optical information recording medium 100 at a time a front surface of the optical information recording medium 100 is tilted becomes large.

Outer surfaces of the substrates 102 and 103 (surfaces that do not come into contact with recording layer 101) may be subjected to AR (Anti-Reflection coating) processing of forming 4 inorganic layers ($Nb_2O_2/SiO_2/Nb_2O_5/SiO_2$) so that light beams having wavelengths for recording and reproduction are not reflected.

The recording layer 101 is formed of various resin materials such as a light-curable resin, a heat-curable resin, and a thermoplastic resin, or a combination of those.

In actuality, the optical information recording medium 100 is produced as follows. After a liquid material M1 (described later in detail) in an uncured state that forms a photopolymer by polymerization, for example, is developed on the substrate 103, the substrate 102 is placed on the liquid material M1. Accordingly, the optical information recording medium 100 in which a portion corresponding to the recording layer 101 in FIG. 1 is constituted of the uncured liquid material M1 (hereinafter, referred to as uncured optical information recording medium 100a) is formed.

As described above, the uncured optical information recording medium 100a is formed as a thin plate as a whole and has a structure in which the liquid material M1 as an uncured photopolymer is interposed between the transparent substrates 102 and 103.

The liquid material M1 is constituted of, for example, as photopolymerization-type and photocrosslinking-type resin materials (both of which will hereinafter be referred to as light-curable resin) constituting a part or most of the liquid material M1, radical-polymerization-type monomers and a radical-generation-type photopolymerization initiator, cationic-polymerization-type monomers and a cation-generation-type photopolymerization initiator, or a mixture of those.

Specifically, in the liquid material M1, monomers or oligomers or both of them (hereinafter, referred to as monomers) are dispersed uniformly. The liquid material M1 has a property that, when irradiated with light, monomers are polymerized (i.e., photopolymerization) at the irradiated position to become photopolymers, and a refractive index and reflectance change in association therewith. The refractive index and reflectance of the liquid material M1 may also change due to so-called photocrosslinking in which the photopolymers are "cross-linked" by the light irradiation and a molar weight thus increases.

Well-known monomers can be used as the monomers. Examples of the radical-polymerization-type monomers include monomers used in a radical polymerization reaction mainly typified by a derivative of acrylic acid, acrylic ester, and amide acrylate, and a derivative of styrene and vinylnaphthalene. Moreover, a compound having an acrylic monomer in a urethane structure is also applicable. Moreover, as the monomer described above, a derivative whose hydrogen atom is substituted by a halogen atom may be used.

Specific examples of the radical-polymerization-type monomers include well-known compounds such as acryloyl morpholine, phenoxyethyl acrylate, isobornyl acrylate, 2-hydroxypropyl acrylate, 2-ethylhexyl acrylate, 1,6-hexanediol diacrylate, tripropylene glycol diacrylate, neopentyl glycol PO-modified diacrylate, 1,9-nonanediol diacrylate, hydroxy pivalate neopentyl glycol diacrylate, acrylic ester, fluorene acrylate, urethane acrylate, octyl fluorene, and benzyl acrylate. It should be noted that those compounds may either be monofunctional or polyfunctional.

Further, the cationic-polymerization-type monomers only need to contain a functional group such as an epoxy group and a vinyl group, and examples thereof include well-known compounds such as epoxy cyclohexyl methyl acrylate, fluorene epoxy, glycidyl acrylate, vinyl ether, and oxetane.

Examples of the radical-generation-type photopolymerization initiator include well-known compounds such as 2,2-dimethoxy-1,2-diphenylethane-1-one, 1-[4-(2-hydroxyethoxy)-phenyl]-2-hydroxy-2-methyl-1-propane-one-one, and bis(2,4,6-trimethyl benzoyl)-phenylphosphine oxide-one.

Examples of the cation-generation-type photopolymerization initiator include well-known compounds such as diphenyliodonium hexafluorophosphate, tri-p-trisulfonium hexafluorophosphate, cumyltolyl iodonium hexafluorophosphate, and cumyltolyl iodonium tetrakis(pentafluorophenyl) boron.

By using the cationic-polymerization-type monomers and the cation-generation-type photopolymerization initiator, a curing shrinkage rate of the liquid material M1 can be reduced as compared to the case of using the radical-polymerization-type monomers and the radical-generation-type photopolymerization initiator. Moreover, it is also possible to use, as the photopolymerization-type and photocrosslinking-type resin materials, a combination of anionic monomers and an anionic photopolymerization initiator.

Furthermore, by appropriately selecting a material of the photopolymerization initiator in particular out of the photopolymerization-type monomers, the photocrosslinking-type monomers, and the photopolymerization initiator, it is possible to adjust a wavelength at which photopolymerization is apt to occur to a desired wavelength.

It should be noted that the liquid material M1 may contain an adequate amount of various additives such as a polymerization inhibitor for preventing a reaction from starting due to unintended light and a polymerization accelerator that accelerates a polymerization reaction.

In an initialization apparatus 1 shown in FIG. 2, the uncured optical information recording medium 100a is structured to function as the recording layer 101 in which the liquid material M1 is initialized by initialization light L1 irradiated from an initialization light source 2 to thus record recording marks.

Specifically, the initialization apparatus 1 emits the initialization light L1 having a wavelength of, for example, 365 nm (e.g., 300 mW/cm$^2$, DC (Direct Current) output) from the initialization light source 2 and irradiates the initialization light L1 onto the plate-like optical information recording medium 100 placed on a table 3. The wavelength and optical power of the initialization light L1 are selected as appropriate to optimal values based on the type of the photopolymerization initiator used for the liquid material M1, the thickness t1 of the recording layer 101, and the like.

As the initialization light source 2, a light source that is capable of irradiating high optical power, such as a high-pressure mercury vapor lamp, a high-pressure metal halide lamp, a solid laser, a xenon lamp, and a semiconductor laser is used.

Moreover, the initialization light source 2 includes a drive portion (not shown) and can freely move in the x direction (right-hand direction in figure) and the y direction (forward direction in figure). The initialization light source 2 is capable of uniformly irradiating the initialization light L1 onto the entire uncured optical information recording medium 100a from an appropriate position with respect to the uncured optical information recording medium 100a.

At this time, the liquid material M1 starts a photopolymerization reaction or a photocrosslinking reaction of the monomers or both of the reactions (all of which will hereinafter be collectively referred to as photoreaction) by generating radicals or cations from the photopolymerization initiator in the liquid material M1. As a result, the liquid material M1 causes the photopolymerization crosslinking reaction of the monomers to proceed in a chain reaction. Then, the monomers become a photopolymer as a result of the polymerization and is cured to thus become the recording layer 101.

It should be noted that since the photoreaction occurs almost uniformly across the entire liquid material M1, refractive indices on the cured recording layer 101 are uniform. In other words, since an amount of return light is uniform even when light is irradiated onto arbitrary positions on the initialized optical information recording medium 100, the optical information recording medium 100 is in a state where information is not recorded at all.

As the recording layer 101, it is also possible to use a thermal-polymerization-type resin material that is polymerized by heat or a thermal-crosslinking-type resin material that cross-links or cures by heat (hereinafter, referred to as heat-curable resin). In this case, as the liquid material M1 as an uncured heat-curable resin, monomers and a curing agent or a thermopolymerization initiator are dispersed uniformly therein, for example. The liquid material M1 has a property of becoming a polymer by the monomers being polymerized or cross-linked at high temperature or at room temperature (hereinafter, referred to as heat curing) and changing its refractive index and reflectance in association therewith.

As the monomers used for the heat-curable resin, well-known monomers can be used, the examples of which include various monomers used as materials of a phenol resin, a melamine resin, a urea resin, a polyurethane resin, an epoxy resin, an unsaturated polyester resin, and the like.

Moreover, as the curing agent used for the heat-curable resin, a well-known curing agent can be used, the examples of which include various curing agents such as amines, a polyamide resin, imidazoles, a polysulfide resin, and isocyanate. The curing agent is selected as appropriate based on a reaction temperature and characteristics of monomers. It should be noted that various additives such as a curing assistant for accelerating a curing reaction may be added.

As the thermopolymerization initiator, various well-known thermopolymerization initiators can be used, the examples of which include an azo-based initiator such as azobisisobutyronitrile, azobis methyl isobutyrate, azobis-2,4-dimethyl valeronitrile, azobiscyclohexane carbonitrile, and azobisisobutylamidine hydrochloride, and a peroxide-based initiator such as benzoyl peroxide, lauroyl peroxide, 2,4-dichlorobenzoyl peroxide, dicumyl peroxide, di-t-butyl peroxide, cumene peroxide, and t-butylhydroperoxide.

By heating the uncured optical information recording medium 100a for a predetermined heating time (e.g., 1 hour) using an oven or the like heated to a predetermined temperature, the optical information recording medium 100 can be produced.

Furthermore, a thermoplastic resin material can be used for the recording layer 101. In this case, as the liquid material M1 developed on the substrate 103, a polymer diluted by a predetermined diluting solvent or a polymer plasticized by heat are used, for example. When using a polymer diluted by a diluting solvent as the liquid material M1, the recording layer 101 is formed by thermal drying. When using a polymer plasticized by heat, the recording layer 101 is formed by cooling.

It should be noted that as the thermoplastic resin material, a well-known resin can be used, the examples of which include various resins such as an olefin resin, a vinyl chloride resin, polystyrene, an ABS (Acrylonitrile Butadiene Styrene Copolymer) resin, polyethylene terephthalate, an acrylic resin, polyvinyl alcohol, a vinylidene chloride resin, a polycarbonate resin, a polyamide resin, an acetal resin, and a norbornene resin.

Moreover, as the diluting solvent, various solvents such as water, alcohols, ketones, an aromatic-based solvent, and a halogen-based solvent, or a mixture of those can be used. It should be noted that various additives such as a plasticizer for changing physical characteristics of a thermoplastic resin may be added.

The recording layer 101 contains a vaporizing material that has a property of vaporizing in accordance with heat. The vaporizing material is vaporized by boiling or thermal decomposition, and a vaporization temperature thereof is 140° C. to 400° C. (meaning 140° C. or more and 400° C. or less; the same holds true for descriptions below).

Figure 3:
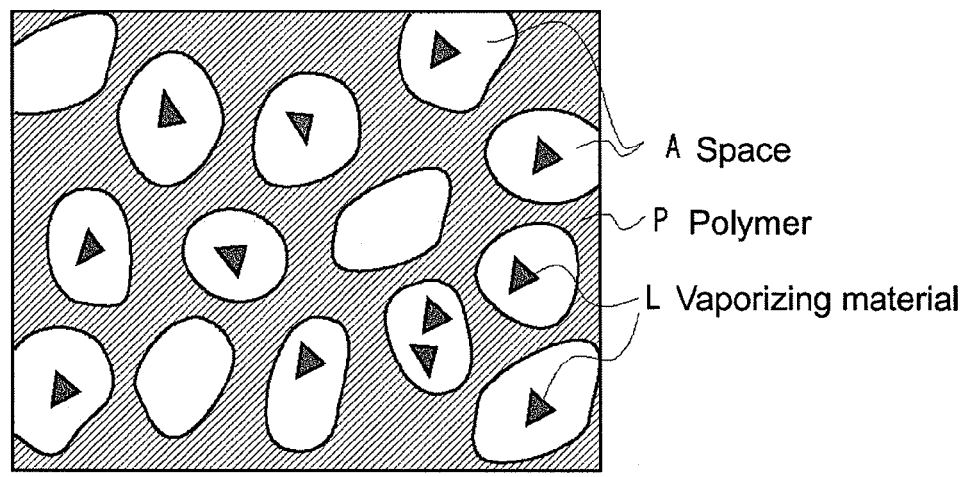
FIG. 3 is a schematic diagram showing a state of a vaporizing material.

Specifically, in the liquid material M1 of the optical information recording medium 100, a vaporizing material such as a photopolymerization initiator, a solvent, and monomers that has a vaporization temperature, at which vaporization is caused by boiling or thermal composition, within the range of 140° C. to 400° C. is mixed. Accordingly, as shown in FIG. 3, in the optical information recording medium 100, a vaporizing material L having a vaporization temperature of 140° C. to 400° C. is scattered within the initialized recording layer 101.

Figure 4A:
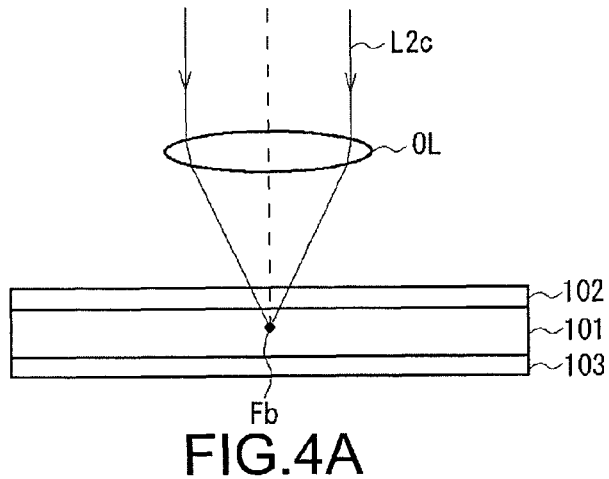
FIG. 4 are schematic diagrams for explaining an irradiation of a light beam.
Figure 4B:
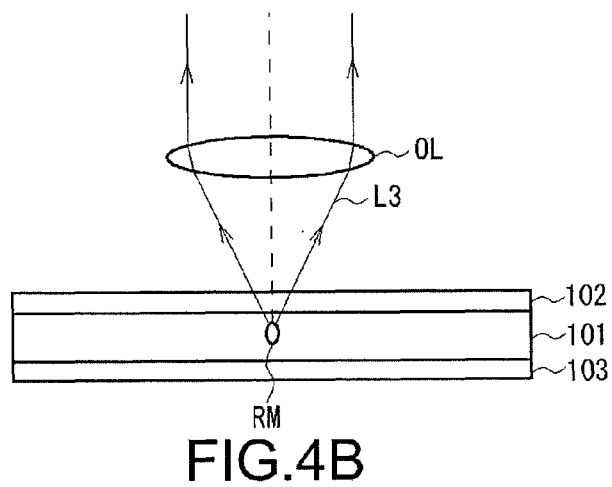

As shown in FIG. 4, when predetermined recording light beams L2 (hereinafter, referred to as recording light beams L2c) are irradiated onto the recording layer 101 via an objective lens OL, a temperature in the vicinity of a focal point Fb of the recording light beams L2c increases locally to reach a temperature as high as 140° C. or more, for example.

At this time, the recording light beams L2c cause the vaporizing material contained in the recording layer 101 in the vicinity of the focal point Fb to vaporize and increase its volume, to thus form a bubble at the focal point Fb. The vaporizing material vaporized at this time is cooled by being transmitted through an inner portion of the recording layer 101 as it is or cooled due to a stop of irradiation of the recording light beams L2c, to thus return to liquid having a small volume. Therefore, in the recording layer 101, only the cavity formed by the bubble remains in the vicinity of the focal point Fb. It should be noted that since a resin like that used in the recording layer 101 normally transmits air at a constant speed, it is considered that the cavity will be filled with air at some stage.

In other words, in the optical information recording medium 100, the recording mark RM constituted of a cavity formed by a bubble at the focal point Fb can be formed as shown in FIG. 4A by vaporizing the vaporizing material contained in the recording layer 101 by irradiating the recording light beams L2c.

A refractive index $n_{101}$ of a photopolymer generally used in the recording layer 101 is about 1.5 and a refractive index $n_{AIR}$ of air is 1.0, thus resulting in a large difference. When the recording mark RM is irradiated with reading light beams L2 (hereinafter, referred to as reading light beams L2d), the recording layer 101 reflects, by a difference in the refractive index at an interfacial surface of the recording mark RM, the reading light beams L2d to generate return light beams L3 in a relatively-large light amount.

Figure 4C:
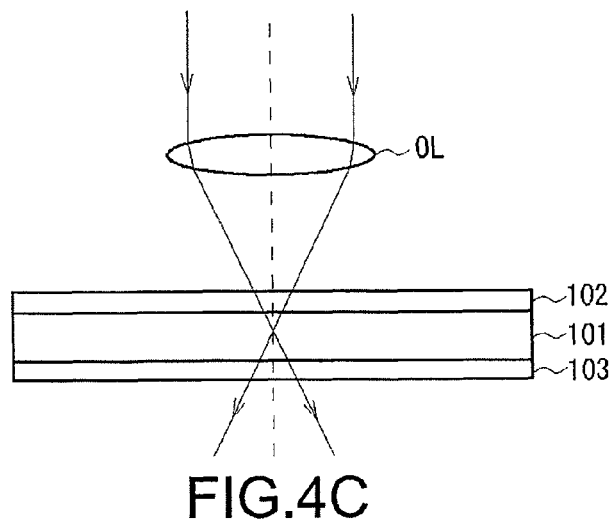

On the other hand, when a predetermined target position on the recording layer 101 at which the recording mark RM is not recorded is irradiated with the reading light beams L2d, the reading light beams L2d are not reflected due to the uniform refractive index $n_{101}$ in the vicinity of the target position as shown in FIG. 4C.

In other words, in the optical information recording medium 100, by irradiating the reading light beams L2d onto the recording layer 101 at a target position and detecting an amount of the return light beams L3 reflected by the optical information recording medium 100, a presence/absence of the recording marks RM in the recording layer 101 can be detected, and information recorded onto the recording layer 101 can thus be reproduced.

Moreover, the vaporizing material is vaporized by heat generated by the recording light beams L2c, and a recording time in the case of a vaporizing material having a relatively-low vaporization temperature tends to be shorter than that in the case of a vaporizing material having a high vaporization temperature in actuality. Therefore, it can be considered that the recording marks RM can be formed more easily as the vaporization temperature of the vaporizing material decreases.

However, it is confirmed that in a general vaporizing material, an endothermic reaction gradually starts from a temperature that is about 60° C. lower than the vaporization temperature. This means that, in a case where the optical information recording medium 100 containing the vaporizing material that has a vaporization temperature at, for example, 120° C., is left under a temperature of about 60° C. for a long period of time, the vaporizing material may gradually vaporize. Therefore, there is a possibility that the vaporizing material is not left due to the evaporation when wishing to form the recording marks RM and the recording marks RM cannot be formed even when the recording light beams L2c are irradiated.

In general, an electronic apparatus like an optical information recording/reproducing apparatus 5 is assumed to be used under a temperature of about 80° C. Therefore, for securing a temperature stability as the optical information recording medium 100, it is desirable to use a vaporizing material with a vaporization temperature of 80° C.+60° C.=140° C. or more. Further, it is considered that the temperature stability can be additionally improved by using a vaporizing material with a vaporization temperature about 5° C. higher than 140° C. (i.e., 145° C.).

Moreover, it is confirmed in the experiment that the recording time is prolonged when the vaporization temperature exceeds 400° C.

From the descriptions above, the vaporization temperature of the vaporizing material mixed in the liquid material M1 is desirably 140° C. to 400° C. (meaning 140° C. or more and 400° C. or less, the same holds true for descriptions below), more desirably 145° C. to 300° C.

It should be noted that when using a heat-curable resin as the recording layer 101, it is desirable to use, as the heat-curable monomers, the curing agent, and the thermopolymerization initiator, a material that cures at room temperature or at a relatively-low temperature so that the vaporizing material does not vaporize. Moreover, it is also possible to heat and cure a part of the heat-curable resin prior to adding the photopolymerization initiator. The same holds true for the case of forming the recording layer 101 by thermal drying, and it is desirable to select a material that can be dried at a relatively-low temperature.

For preventing an adverse effect such as lowering of an elastic modulus of the recording layer 101 due to a presence of a low-molecular-weight vaporizing material in the recording layer 101, the vaporizing material is desirably 0.8 parts by weight to 50.0 parts by weight, more desirably 2.5 parts by weight to 40.0 parts by weight with respect to 100 parts by weight of monomers.

It is particularly desirable for the vaporizing material to be a so-called photopolymerization initiator that generates radicals, cations, anions, and the like in accordance with ultraviolet rays of 400 nm or less. This is because the photopolymerization initiator is capable of appropriately absorbing light having a wavelength of 405 nm that is close to that of ultraviolet rays and vaporizing by its own heat.

Further, when using a light-curable resin for the liquid material M1, by mixing an excessive amount of a photopolymerization initiator, the unconsumed photopolymerization initiator (hereinafter, referred to as photopolymerization initiator residue) can be incorporated into the recording layer 101 as it is as the vaporizing material. In this case, it is desirable to mix the photopolymerization initiator while taking into account an amount of the consumed photopolymerization initiator.

It should be noted that the optical information recording medium 100 can also be formed by attaching the solid recording layer 101 formed on the substrate 103 or the recording layer 101 formed in advance as a solid sheet to the substrate 102 or 103 by an adhesive or an adhesive sheet. Further, the substrates 102 and 103 do not always need to be provided, and the optical information recording medium 100 may be constituted of the recording layer 101 alone.

Figure 5:
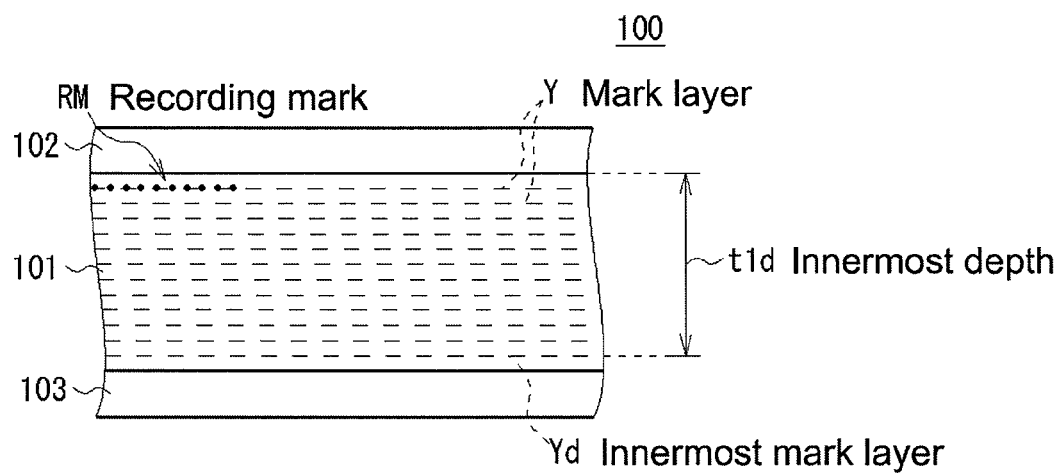
FIG. 5 is a schematic diagram showing a mark layer in a recording layer.

Furthermore, as shown in FIG. 5, a plurality of layers (hereinafter, referred to as mark layers) Y in which the recording marks RM are aligned are formed across the recording layer 101. It should be noted that since the mark layers Y are formed by arranging the recording marks RM, each of the mark layers Y exists virtually before the recording marks RM are formed. The number of mark layers Y to be formed in the recording layer 101 is not limited, but it is desirably 10 or more, more desirably 20 or more in view of increasing a storage capacity of the optical information recording medium 100.

Here, the mark layer Y most distant from the substrate 102 that the recording light beams L2c enter is referred to as innermost mark layer Yd, and a thickness from an interfacial surface of the substrate 102 to the innermost mark layer Yd is referred to as innermost depth t1d. A light absorption amount with respect to measurement light having the same wavelength as the recording light beams L2c is referred to as recording light absorption amount, and a light absorption amount with respect to measurement light having a wavelength 10 nm shorter than that of the recording light beams L2c is referred to as short-wavelength light absorption amount.

The recording layer 101 desirably has a recording light absorption amount per innermost depth t1d of 20.8% or less. If the recording light absorption amount becomes large, most of the recording light beams L2c is absorbed by the recording layer 101 before the recording light beams L2c reach the innermost mark layer Yd, with the result that an optical intensity of the recording light beams L2c at the target position is lowered.

It is desirable for the recording layer 101 to have a change amount of the short-wavelength light absorption amount (hereinafter, referred to as short-wavelength absorption change amount) with respect to the recording light absorption amount per thickness of 0.30 mm of 8.0% or more.

Here, a large short-wavelength absorption change amount means that a value of the short-wavelength light absorption amount is large. The recording light beams L2c are condensed and irradiated onto a target position (i.e., focal position of recording light beams L2c) with a high optical intensity. At this time, the recording layer 101 is known to behave as if light having a wavelength slightly shorter than that of the recording light beams L2c has been irradiated. In other words, if the short-wavelength light absorption amount is large, it becomes possible for the recording layer 101 to absorb a large amount of recording light beams L2c to readily generate heat and form the recording marks RM in a short period of time.

In contrast, a short-wavelength absorption change amount smaller than 8.0% means that a value of the short-wavelength light absorption amount is small. At this time, the recording layer 101 cannot absorb a large amount of recording light beams L2c, and it takes time to form the recording marks RM.

Specifically, due to a large short-wavelength absorption change amount, the recording layer 101 can suppress the absorption amount of the recording light beams L2c in an area except the area in the vicinity of the target position while increasing the absorption amount of the recording light beams L2c in the vicinity of the target position.

It should be noted that the recording light absorption amount varies depending on the innermost depth t1d and the thickness t1. A general physics formula that expresses a transmittance T is shown below. In Equation (1), k represents an absorption coefficient, d represents the thickness t1, and λ represents a wavelength of irradiated light. In Equation (1), if the transmittance is 20%, the light absorption amount can be calculated by 1−T, that is, T=0.2.

$$T = \exp\left(-\frac{2\pi k d}{\lambda}\right) \quad (1)$$

Therefore, d=innermost depth t1d and d=0.30 mm are substituted as well as calculate an absorption coefficient $k_1$ by measuring a transmittance of the entire recording layer 101 with respect to the wavelength of the recording light beams L2c. Accordingly, the recording light absorption amount per innermost depth t1d and the recording light absorption amount per 0.30 mm can be calculated.

Moreover, the short-wavelength absorption change amount indicates a change amount of the light absorption amount, that is, 1−T. Here, since the absorption coefficient k of the light absorption amount and the wavelength λ of the irradiated light do not change even when the thickness t1 is changed, the recording light absorption amount and the short-wavelength absorption change amount change based only on the thickness t1.

A short-wavelength absorption change amount ΔAb is expressed in Equation (2) below, where the light absorption amount with respect to measurement light having the same wavelength as the recording light beams L2c is represented by $1-T_1$, the light absorption amount with respect to measurement light having a wavelength 10 nm shorter than that of the recording light beams L2c is represented by $1-T_2$, an absorption coefficient with respect to measurement light having the same wavelength as the recording light beams L2c is represented by $k_1$, and the absorption coefficient with respect to measurement light having a wavelength 10 nm shorter than that of the recording light beams L2c is represented by $k_2$.

$$\Delta Ab = 1 - T_1 - (1 - T_2) = \exp\left(-\frac{2\pi k_1 d}{\lambda}\right) - \exp\left(-\frac{2\pi k_2 d}{\lambda}\right) \quad (2)$$

Thus, when the thickness t of the recording layer 101 is not 0.30 mm, the absorption coefficient $k_2$ with respect to measurement light having a wavelength 10 nm shorter than that of the recording light beams L2c is calculated as well as the absorption coefficient $k_1$ with respect to measurement light having the same wavelength as the recording light beams L2c. Then, by setting the value of d in Equation (2) to 0.30 mm, the short-wavelength absorption change amount per 0.30 mm can be calculated.

As described above, the recording layer 101 has a recording light absorption amount per innermost depth t1d of 20.8% or less. Accordingly, the recording layer 101 can suppress the absorption amount of the recording light beams L2c in the area other than the area in the vicinity of the target position and enable the recording light beams L2c to reach the innermost mark layer Yd while keeping a high optical intensity.

Moreover, the recording layer 101 has a short-wavelength absorption change amount per 0.30 mm of 8.0% or more. Accordingly, the recording layer 101 can increase the absorption amount of the recording light beams L2c in the vicinity of the target position to readily generate heat and form the recording marks RM in a short period of time.

2. Example 1

2-1. Production of Sample 0.8 parts by weight of a photopolymerization initiator A shown below was added as a vaporizing material and a photopolymerization initiator to 100 parts by weight of a mixture of an acrylic ester monomer (p-cumylphenol ethylene oxide-added acrylic ester) and a urethane-2-functional oligomer acrylate as monomers (ratio by weight of 40:60) and subjected to mixing and defoaming in a dark room to thus obtain a liquid material M1. A composition of the liquid material M1 is shown below.

TABLE 1

| | | S1 |
|---|---|---|
| Monomer | Acrylic ester monomer | 40 |
| | Urethane-2-functional oligomer acrylate | 60 |
| Polymerization initiator | A | 0.8 |

Photopolymerization initiator A: (bis(η-2,4-cyclopentadiene-1-yl)-bis(2,6-difluoro-3-1H-pyrrole-1-yl)-phenyl)titanium Then, the liquid material M1 was developed on the substrate 103 and interposed between the substrates 102 and 103 to thus produce an uncured optical information recording medium 100a. The uncured optical information recording medium 100a was irradiated with the initialization light L1 (power density of 250 mW/cm² at wavelength of 365 nm) from the initialization light source 2 constituted of a high-pressure mercury vapor lamp for 10 sec, to thus produce a sample S1 as the optical information recording medium 100. It should be noted that the thickness t1 of the recording layer 101 was 0.5 mm, the thickness t2 of the substrate 102 was 0.7 mm, and the thickness t3 of the substrate 103 was 0.7 mm.

2-2. Measurement of Vaporization Temperature

Next, the vaporization temperature of the photopolymerization initiator A used for the sample S1 was measured by TG/DTA (Thermogravimetry/Differential Thermal Analysis). The measurement conditions are as follows.

Atmosphere: $N_2$ (nitrogen atmosphere)
Rate of temperature rise: 20° C./min
Measurement temperature: 40° C. to 600° C.
Apparatus used: TG/DTA 300 (available from Seiko Instruments Inc.)

As a result of the TG/DTA measurement, a temperature at which the weight reduces most sharply in a TG curve indicating a weight change was used as the vaporization temperature of the photopolymerization initiator A. The vaporization temperature of the photopolymerization initiator A was 232° C. In a case where a measurement target has a plurality of vaporization temperatures, a lowest temperature at which the weight reduces most sharply out of the plurality of temperatures is used as the vaporization temperature of the measurement target.

As described above, the photopolymerization initiator A was confirmed to have a vaporization temperature within the range of 140° C. to 400° C.

2-3. Forming and Reading Out of Recording Marks

2-3-1. Structure of Optical Information Recording/Reproducing Apparatus

Figure 6:
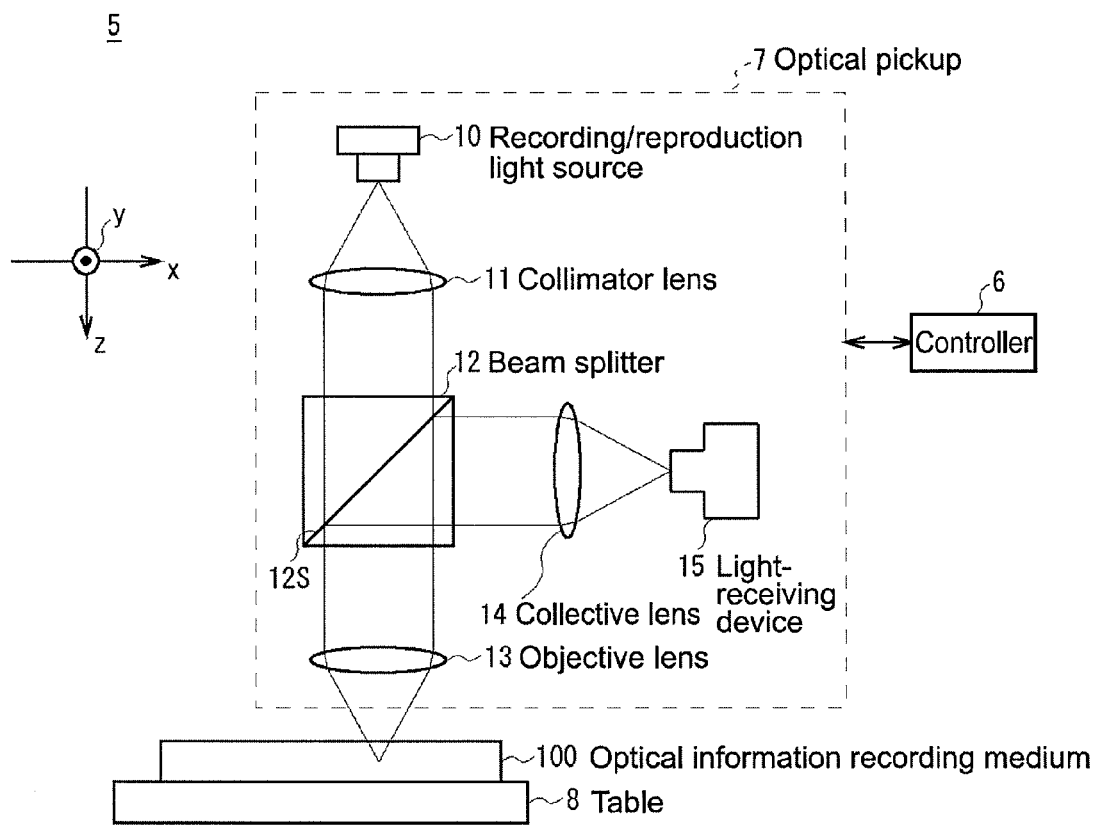
FIG. 6 is a schematic diagram showing a structure of an optical information recording/reproducing apparatus.

In FIG. 6, the optical information recording/reproducing apparatus 5 has an overall structure in which, by irradiating light onto the recording layer 101 of the optical information recording medium 100, information is recorded/reproduced onto/from a plurality of mark layers Y assumed in the recording layer 101. The mark layers Y are each formed by arranging the recording marks RM, so the mark layers Y exist virtually before the recording marks RM are formed.

The optical information recording/reproducing apparatus 5 can be controlled collectively by a controller 6 constituted of a CPU (Central Processing Unit). The optical information recording/reproducing apparatus 5 reads out various programs including a basic program, an information recording program, an information reproduction program, and the like from a ROM (Read-Only Memory) (not shown) and develops the read-out programs on a RAM (Random Access Memory) (not shown) to thus execute various types of processing such as information recording processing and information reproduction processing.

The controller 6 controls an optical pickup 7 to irradiate light onto the optical information recording medium 100 and receive light that has returned from the optical information recording medium 100.

Under control of the controller 6, the optical pickup 7 emits light beams L2 having a wavelength of, for example, 405 nm from a recording/reproduction light source 10 constituted of a laser diode as a DC output and causes the light beams L2 to enter a beam splitter 12 after being converted into parallel light from spread-out light by a collimator lens 11.

The recording/reproduction light source 10 is capable of adjusting a light amount of the light beams L2 under control of the controller 6.

The beam splitter 12 partially transmits the light beams L2 by a reflection-transmission plane 12S and causes the transmitted light beams L2 to enter an objective lens 13. The objective lens 13 condenses the light beams L2 to focus at an arbitrary position on the optical information recording medium 100.

The objective lens 13 also converts, when return light beams L3 return from the optical information recording medium 100, the return light beams L3 into parallel light so that the converted light beams enter the beam splitter 12. At this time, the beam splitter 12 reflects a part of the return light beams L3 by the reflection-transmission plane 12S so that the reflected light beams enter a collective lens 14.

The collective lens 14 condenses the return light beams L3 and irradiates them onto a light-receiving device 15. The light-receiving device 15 detects a light amount of the return light beams L3 upon receiving the return light beams L3 and generates and transmits a detection signal corresponding to the light amount to the controller 6. Accordingly, the controller 6 can recognize a detection state of the return light beams L3 based on the detection signal.

Incidentally, the optical pickup 7 is provided with a drive portion (not shown) and can freely move in triaxial directions of the x direction, the y direction, and the z direction under control of the controller 6. In actuality, the controller 6 is capable of controlling the position of the optical pickup 7 so as to position a focal position of the light beams L2 at a desired position.

As described above, the optical information recording/reproducing apparatus 5 is capable of condensing the light beams L2 at an arbitrary position on the optical information recording medium 100 and detect the return light beams L3 from the optical information recording medium 100.

(2-3-2. Shape of Recording Mark)

Figure 7A:
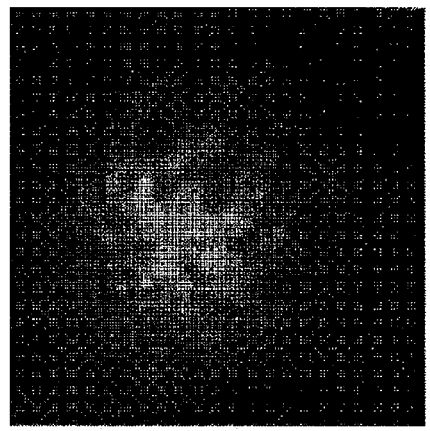
FIG. 7 are schematic diagrams for explaining a detection of a return light beam.
Figure 7B:

FIG. 7 show states of the return light beams L3 actually detected by the light-receiving device 15. FIG. 7A shows a case where a recording mark RM is formed at a focal position of the reading light beams L2d, and FIG. 7B shows a case where a recording mark RM is not formed at the focal position of the reading light beams L2d.

In addition, as a result of measuring an optical intensity distribution of the return light beams L3 obtained as a result of the reading light beams L2d being reflected by the recording marks RM formed on the sample S1 in the x direction, the y direction, and the z direction, the results as shown in FIGS. 8A and 8B were obtained. Characteristic curves Sx, Sy, and Sz indicate a distribution of a signal intensity (i.e., optical intensity) obtained by the light-receiving device 15 at a time a focal point of the reading light beams L2d is displaced in the x direction, the y direction, and the z direction about a target position.

Here, with a position deviated 0.1 mm from the interfacial surface between the recording layer 101 and the substrate 102 in the z direction as a target position, the optical information recording/reproducing apparatus 5 has recorded the recording marks RM onto the sample S1 with NA of the objective lens 13 of 0.35, a wavelength of the recording light beams L2c of 405 nm, optical power of 20 mW, and a recording time of 1.5 sec. Moreover, the optical information recording/reproducing apparatus 5 has set a wavelength of the reading light beams L2d to 405 nm and optical power to 0.1 mW.

It can be seen from the distribution characteristics of FIGS. 8A and 8B that the recording marks RM are formed to be approximately oval as a whole, and a diameter on an xy plane is about 1 μm and a height in the z direction is about 10 μm.

Figure 9:
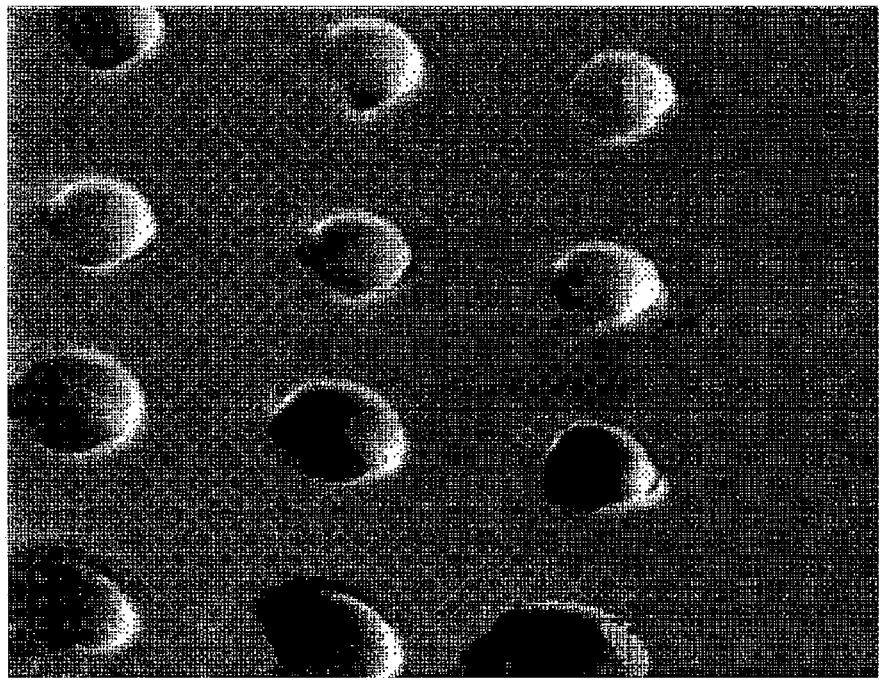
FIG. 9 is a schematic diagram showing a photograph of a cross section of recording marks.

Moreover, FIG. 9 shows an SEM (Scanning Electron Microscopic) photograph of a cross section of the sample S1 on which the recording marks RM are formed. It can be seen from the photograph of FIG. 9 that cavities are formed as the recording marks RM.

It should be noted that in a simulation in which the refractive index $n_{101}$ of the recording layer 101 is 1.5 and a refractive index $n_{RM}$ inside the recording marks RM (cavities) is 1.0, the light-receiving device 15 was able to receive the return light beams L3 at an optical intensity of 0.16% with respect to the optical intensity of the reading light beams L2d.

2-4. Reproduction of Multilayer Recording

Next, a multilayer recording (so-called volume-type recording) was performed on the sample S1 by changing a position of a target position in the z direction stepwise, and the return light beams L3 (i.e., reproduction light) from the recording marks RM at this time were measured.

Specifically, by changing the position of the optical pickup 7 in the x direction, the y direction, and the z direction, the optical information recording/reproducing apparatus 5 first recorded the recording marks RM across 17 layers while changing the target position in the recording layer 101 in the 3-dimensional directions. In this case, intervals of the recording marks RM on the xy plane of each layer (hereinafter, referred to as mark recording layer) were set to 3 μm, and intervals of the mark recording layers were set to 22.5 μm.

Next, the optical information recording/reproducing apparatus 5 irradiated the reading light beams L2d onto the mark recording layers of the optical information recording medium 100 in a focused manner, and detected the return light beams L3. Detection results of the return light beams L3 in the second layer (side closer to substrate 102), the fifth layer, the eighth layer, and the eleventh layer at this time are shown in FIGS. 10A, 10B, 11A, and 11B, respectively.

In FIGS. 10A, 10B, 11A, and 11B, the ordinate axis represents a signal intensity, and the abscissa axis represents a position in the x direction. The figures show measurement results of signal intensities at a time the focal position of the reading light beams L2d is moved in the x direction in the mark recording layers.

As is apparent from FIGS. 10A, 10B, 11A, and 11B, in any of the first to eleventh mark recording layers of the optical information recording medium 100, a difference in the signal intensities between a position at which the recording mark RM is formed and a position at which the recording mark RM is not formed (position that has only been initialized) is prominent.

Specifically, the optical information recording/reproducing apparatus 5 can obtain, in a case where the mark recording layers are formed across at least 11 layers by the multilayer recording, favorable reproduction signals by detecting the recording marks RM recorded in each layer as return light beams L3 having a necessary and sufficient signal intensity, and read out with high accuracy the presence/absence of the recording marks RM, that is, which of values "0" and "1" is recorded as the information.

FIGS. 10 and 11 show light-receiving results at a time a wavelength of the recording light beams L2c and the reading light beams L2d used in recording and reproducing information onto/from the optical information recording medium 100 is 405 nm, the optical power of the recording light beams L2c is 10 mW, the recording time is 2 to 5 sec, the optical power of the reading light beams L2d is 1 mW, and the NA of the objective lens 13 is 0.35.

As described above, it was confirmed that, in the optical information recording medium 100, it is possible to detect the presence/absence of the recording marks RM by receiving the return light beams L3 as a reflection from the recording marks RM as well as actually record the recording marks RM onto the plurality of mark layers Y.

3. Example 2

3-1. Production of Sample

Under the following conditions, samples S11 to S15 each as the optical information recording medium 100 were produced. Moreover, as samples for comparison, comparative samples R1 to R4 each as the optical information recording medium 100 were also produced.

It should be noted that photopolymerization initiators used in Example 2 (shown below) are expressed as photopolymerization initiators A to E and G, and a thermopolymerization initiator is expressed as a thermopolymerization initiator F (hereinafter, collectively referred to as polymerization initiators A to G). It should be noted that the photopolymerization initiator A is the same as the photopolymerization initiator A used in Example 1. As the other polymerization initiators, commercially-available polymerization initiators are used. Since the polymerization initiators are commercialized products, they may contain various auxiliary agents in addition to the following compounds.

Photopolymerization initiator B: Cumyltolyl iodonium tetrakis(pentafluorophenyl)boron Photopolymerization initiator C: 2-hydroxy-2-methyl-1-phenyl-propane-1-one Photopolymerization initiator D: tri(pentafluorophenyl)boron Photopolymerization initiator E: 2-hydroxy-2-methyl-1-phenyl-propane-1-one Thermopolymerization initiator F: Phenyl carbazole Photopolymerization initiator G: [4-(methyl phenylthio)phenyl]phenylmethane The polymerization initiators A to G were added to 100 parts by weight of the monomers and subjected to mixing and defoaming in a dark room to thus obtain a liquid material M1.

A list of compositions of the monomers and the polymerization initiators in the liquid material M1 used for the samples S11 to S15 and the comparative samples R1 to R4 as shown below. It should be noted that the photopolymerization initiators A to E and G are mixed as polymerization initiators for polymerizing the monomers and vaporizing materials.

TABLE 2

| | Sample | S11 | S12 | S13 | R1 | R2 | R3 |
|---|---|---|---|---|---|---|---|
| Monomer | Acrylic ester X | 40 | 40 | 40 | 40 | 40 | 40 |
| | Fluorene-2-functional acrylate | 60 | 60 | 60 | 60 | 60 | 60 |
| Polymerization initiator | B | 10 | 10 | 10 | 10 | 10 | 10 |
| | C | 1 | — | 0.99 | — | — | — |
| | A | — | 0.1 | — | — | — | — |
| | D | — | — | 0.01 | 0.01 | 0.05 | — |

| | Sample | R4 | S14 | S15 |
|---|---|---|---|---|
| Monomer | Acrylic ester Y | 40 | — | — |
| | Acrylic ester Z | — | 40 | 40 |
| | Urethane-2-functional acrylate | 60 | — | — |
| | Fluorene-2-functional acrylate | — | 60 | 60 |
| Polymerization initiator | E | 10 | — | — |
| | B | — | 1 | 1 |
| | F | 0.8 | 0.8 | 0.8 |
| | G | — | 5 | 3 |

It should be noted that the acrylic ester X is p-cumylphenol ethylene oxide-added acrylic ester, and the fluorene-2-functional acrylate is diphenyl fluorene EO (Ethylene Oxide)-degenerated diacrylate. Moreover, the acrylic ester Y is 2-ethylhexyl acrylate, and the acrylic ester Z is benzyl acrylate.

The liquid material M1 was developed on the substrate 103 an interposed between the substrates 102 and 103 to thus produce an uncured optical information recording medium 100a. For the samples S11 to S13 and the comparative samples R1 to R3, the liquid material M1 was cured by photopolymerization. The uncured optical information recording medium 100a was irradiated with the initialization light L1 (power density of 42 mW/cm$^2$ at wavelength of 365 nm) from the initialization light source 2 constituted of a high-pressure mercury vapor lamp for 60 sec, to thus produce the samples S11 to S13 and the comparative samples R1 to R3 each as the optical information recording medium 100.

For the samples S14 and S15 and the comparative sample R4, the liquid material M1 was cured by thermopolymerization. The uncured optical information recording medium 100a was heated for 1 hour in a thermostatic chamber of 100° C. to thus produce the samples S14 and S15 and the comparative sample R4 each as the optical information recording medium 100.

The thickness t1 of the recording layer 101 in each of the samples S11 to S15 and the comparative samples R1 to R4 was 0.30 mm. It should be noted that the thickness t1 of the recording layer 101 was measured as a mean value of the entire recording layer 101 using a laser-scanning displacement gauge (LT-9030M head of LT-9000 series, available from KEYENCE CORPORATION).

3-2. Measurement of Vaporization Temperature

Figure 12:
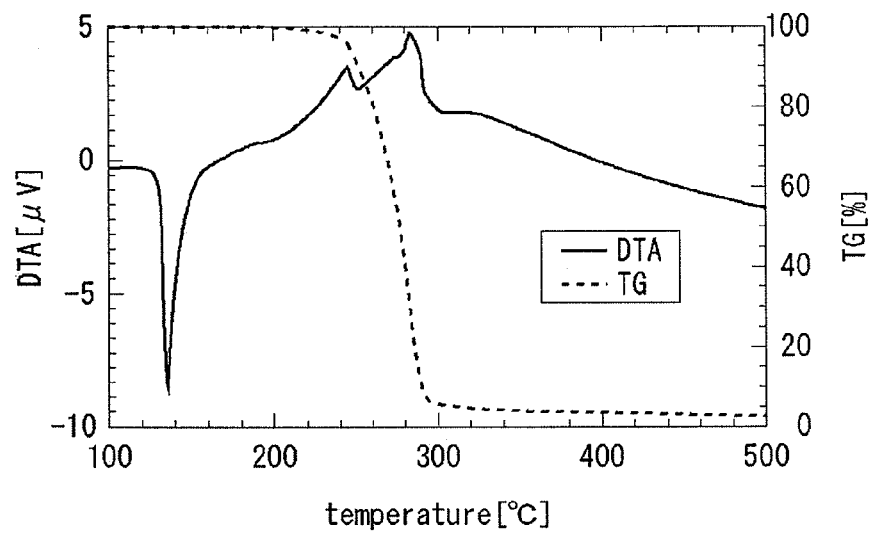
FIG. 12 is a schematic diagram for explaining a measurement of a vaporization temperature.

Similar to Example 1, vaporization temperatures of the photopolymerization initiators B, C, and D were measured. The vaporization temperatures of the photopolymerization initiators are shown below. Further, FIG. 12 shows TG/DTA curves of the photopolymerization initiator B.

TABLE 3

| Photopolymerization initiator | Vaporization temperature (° C.) |
|---|---|
| B | 290 |
| C | 147 |
| D | 282 |

As shown in the table, the photopolymerization initiators B, C, and D were confirmed to have vaporization temperatures within the range of 140° C. to 400° C.

3-3. Measurement of Recording Speed

The optical information recording/reproducing apparatus 5 irradiated the recording light beams L2c onto the recording layer 101 of the samples S11 to S15 and the comparative samples R1 to R4 at a target position at a depth of 25 μm to 250 μm from the interfacial surface between the recording layer 101 and the substrate 102. Here, the optical information recording/reproducing apparatus 5 irradiated the recording light beams L2c having a wavelength of 405 nm and optical power of 55 mW via the objective lens 13 having a numerical aperture NA of 0.5.

For measuring a shortest recording time possible, the optical information recording/reproducing apparatus 5 irradiated the recording light beams L2c while increasing the optical intensity every μsec from 30 μsec.

As in Example 1, the shortest recording time obtained at a time the return light beams L3 having a sufficient light amount is detected by the light-receiving device 15 was used as the recording time. The recording times of the samples S11 to S15 and the comparative samples R1 to R4 are shown below.

TABLE 4

|  | Recording time at time reflection is detected (μ sec) |
|---|---|
| Sample S11 | 90 |
| Sample S12 | 80 |
| Sample S13 | 80 |
| Comparative sample R1 | 120 |
| Comparative sample R2 | 130 |
| Comparative sample R3 | 300 |
| Comparative sample R4 | 14000 |
| Sample S14 | 39 |
| Sample S15 | 44 |

As can be seen from the table, the recording times of the samples S11 to S15 were all values smaller than 100 μsec and were as small as 90 μsec or less. In contrast, the recording times of the comparative samples R1 to R4 were all values exceeding 100 μsec.

3-4. Measurement of Light Absorption Amount

Next, a light absorption amount with respect to the samples S11 to S15 and the comparative samples R1 to R4 each as the optical information recording medium 100 described above were measured.

The light absorption amount of the optical information recording medium 100 was measured using a spectrophotometer. Specifically, the optical information recording medium 100 was first set while tilting 5 degrees from a light-emitting direction of the spectrophotometer (V560 available from JASCO Corporation) and irradiated with measurement light so that a reflectance and transmittance of the measurement light with respect to the optical information recording medium 100 were measured for each wavelength. A value obtained by subtracting the reflectance and transmittance from 100% was used as the light absorption amount. It should be noted that optical intensities of the measurement light within the range of 415 nm to 395 nm were 0.3 μW/cm².

Table 5 shows light absorption amounts with respect to the measurement light at wavelengths of 415 nm, 405 nm, and 395 nm. Table 5 also shows a short-wavelength absorption change amount and a long-wavelength absorption change amount that indicate changes in the light absorption amounts with respect to measurement light having wavelengths 10 nm shorter/longer than 405 nm as the wavelength of the recording light beams L2c.

TABLE 5

|  | Light absorption amount (%) | | | Absorption change amount (%) | |
|---|---|---|---|---|---|
|  | 415 nm | 405 nm | 395 nm | 405-415 nm | 395-405 nm |
| Sample S11 | 11.0 | 12.8 | 23.5 | 1.8 | 10.7 |
| Sample S12 | 20.0 | 24.4 | 32.5 | 4.4 | 8.1 |
| Sample S13 | 24.3 | 23.9 | 32.1 | −0.4 | 8.2 |
| Comparative sample R1 | 27.5 | 26.0 | 34.5 | −1.5 | 8.5 |
| Comparative sample R2 | 39.5 | 40.0 | 49.0 | 0.5 | 9.0 |
| Comparative sample R3 | 4.8 | 9.9 | 17.0 | 5.1 | 7.1 |
| Comparative sample R4 | 2.0 | 2.3 | 2.8 | 0.3 | 0.5 |
| Sample S14 | 4.5 | 8.0 | 25.3 | 3.5 | 17.3 |
| Sample S15 | 3.2 | 4.3 | 16.8 | 1.1 | 12.5 |

Figure 13:
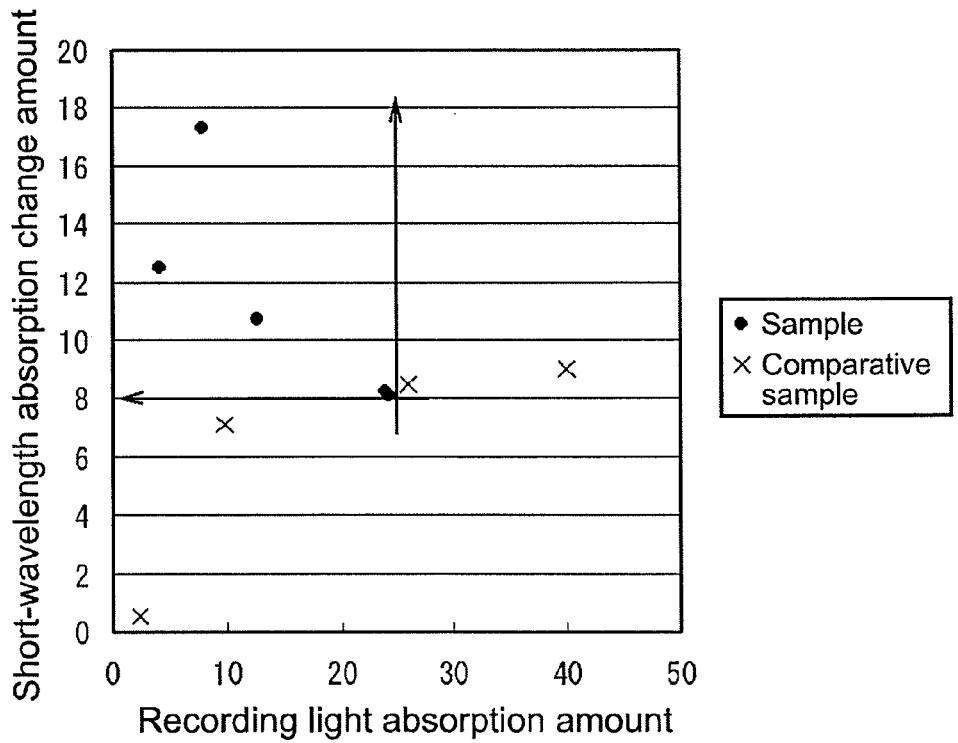
FIG. 13 is a schematic diagram showing a relationship between a recording light absorption amount and a short-wavelength absorption change amount.

FIG. 13 shows a relationship between the recording light absorption amount and the short-wavelength absorption change amount. In FIG. 13, the abscissa axis represents the recording light absorption amount with respect to measurement light of 405 nm, and the ordinate axis represents the short-wavelength absorption change amount. As can be seen from FIG. 13, in the samples S11 to S15 that show small recording times, the recording light absorption amount was 25.0% or less and the short-wavelength absorption change amount was 8.0% or more.

In contrast, as can be seen from Table 5, in the samples S11 to S15, values of the long-wavelength absorption change amount are varied, and no significant difference from the comparative samples R1 to R4 was confirmed.

In the recording layer 101, when the recording light absorption amount exceeds 25.0%, a large amount of the recording light beams L2c is absorbed in the area other than the area in the vicinity of the focal point of the recording light beams L2c inside the recording layer 101. As a result, when the recording light absorption amount exceeds 25.0%, the optical intensity of the recording light beams L2c at the focal point of the recording light beams L2c is weakened and the recording time is prolonged.

Therefore, it is desirable for the recording layer 101 to have a recording light absorption amount with respect to light having the same wavelength as the recording light beams L2c of 25.0% or less.

It should be noted that the recording light absorption amount in Example 2 is a value obtained at a time the thickness t1 of the recording layer 101 is 0.30 mm. In the experiment, recording is performed from the interfacial surface between the recording layer 101 and the substrate 102 to a point 0.25 mm away from the interfacial surface, so the innermost depth t1d at this time is 0.25 mm. Thus, the recording light absorption amount per innermost depth t1d (calculated by Equation (1)) is desirably 20.8% or less.

Figure 14:
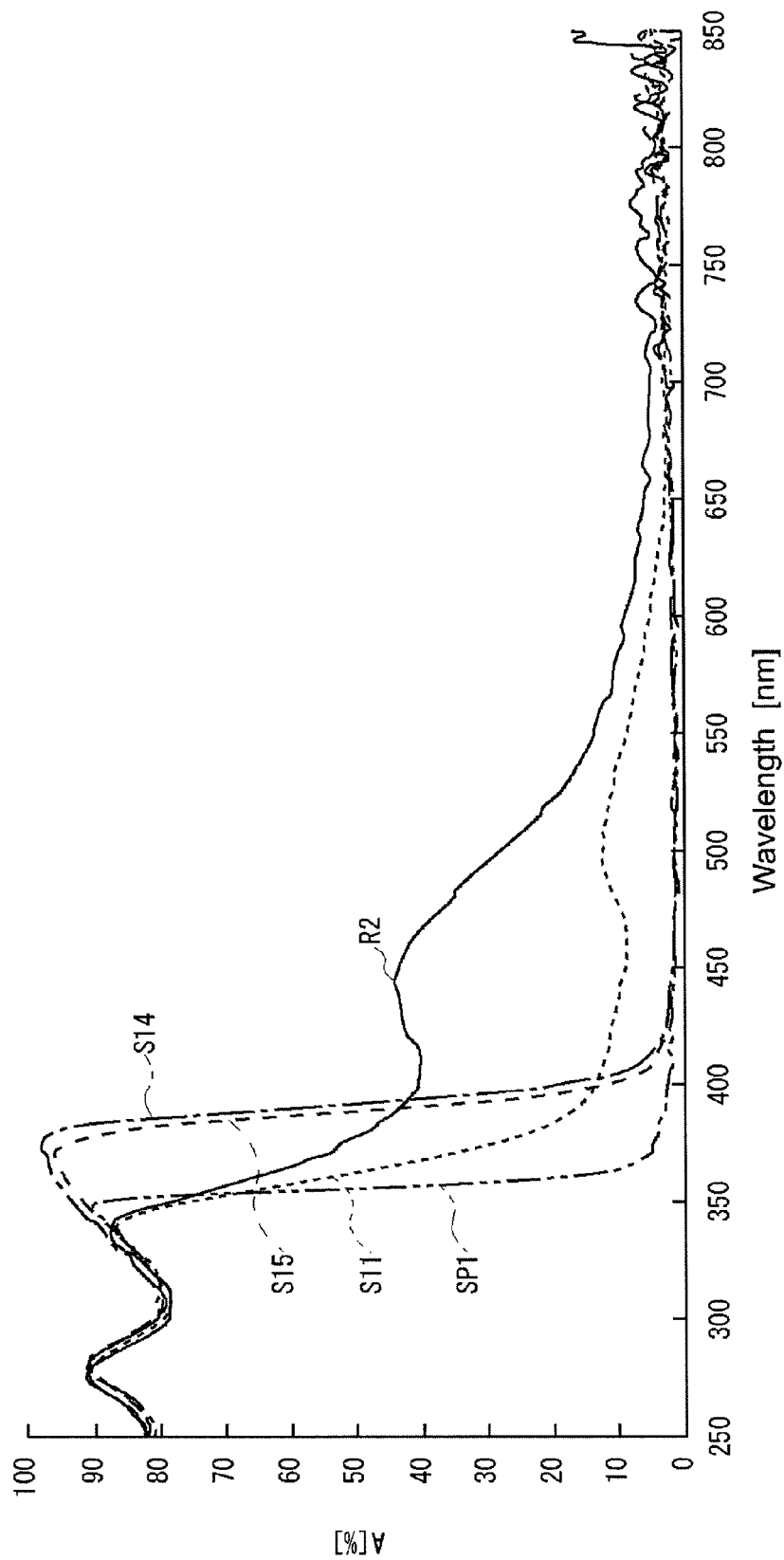
FIG. 14 is a schematic diagram for explaining a comparison of absorbed light amounts.

FIG. 14 shows, with the abscissa axis representing a wavelength and the ordinate axis representing a light absorption amount, the light absorption amount for each wavelength in the samples S11, S14, and S15 and the comparative samples R2 and R4. Here, the light absorption amounts largely change within the wavelength range of 305 nm to 420 nm in the samples.

At a portion at which the light absorption amounts largely change, the light absorption amounts are influenced by small changes in conditions. Since the optical intensity of the measurement light is small as described above, it can be said to represent the light absorption amount in the area other than the area in the vicinity of the focal point of the recording light beams L2c.

In the vicinity of the focal point of the recording light beams L2c, the optical intensity of the recording light beams L2c is significantly increased due to the condensation, and the recording light beams L2c behave as light beams having a shorter wavelength than the actual wavelength thereof. In other words, a state where the graph shown in FIG. 14 is slightly shifted to the long-wavelength side is obtained.

Therefore, it can be considered that, when the short-wavelength absorption change amount is as large as 8.0% or more, even when the recording light absorption amount in Table 5 is small, the recording layer 101 can effectively absorb the recording light beams L2c to readily generate heat so that the recording marks RM can be formed in a short period of time. Thus, the short-wavelength absorption change amount is desirably 8.0% or more.

Here, an intersection of a tangent with respect to an area with a large change in the light absorption amount and a tangent with respect to an area with a small change in the light absorption amount is called an absorption end. Absorption ends of the samples S11, S14, and S15 and the comparative samples R2 and R4 are shown below.

TABLE 6

|  | Absorption end (nm) |
| --- | --- |
| Sample S11 | 388 |
| Comparative sample R2 | 398 |
| Comparative sample R4 | 365 |
| Sample S14 | 403 |
| Sample S15 | 407 |

As can be seen from the table, the absorption ends of the samples S11, S14, and S15 are within the range of 385 nm to 410 nm. In the recording layer 101, it is desirable for the absorption end to be in a range of +5 nm to −20 nm with respect to 405 nm as the wavelength of the recording light beams L2c, more desirably in a range of +2 nm to −17 nm with respect to 405 nm.

The absorption end indicates a kind of an inflection point to rapidly increase the light absorption amount from the long-wavelength side to the short-wavelength side, and a significant increase in the light absorption amount can be seen from a point slightly on the long-wavelength side from the absorption end (about 5 to 20 nm) to the short-wavelength side. In other words, the light absorption amount largely changes before and after the absorption end.

Thus, it is possible to suppress the absorption amount with respect to light having a low optical intensity and increase the absorption amount with respect to light having a high optical intensity before and after the absorption end. In other words, before and after the absorption end, the recording light beams L2c can be effectively absorbed in the vicinity of the focal point with a high optical intensity while suppressing the absorption in the area other than the area in the vicinity of the focal point with a low optical intensity regarding the recording light beams L2c.

It should be noted that although the absorption end is within the range of 385 nm to 410 nm in the comparative sample R2, the recording light absorption amount per 0.30 mm is larger than 25.0% (i.e., 20.8% per innermost depth t1d). Therefore, in the comparative sample R2, the recording time exceeds 100 µsec.

Thus, it is desirable for the recording layer 101 to have an absorption end within the range of 385 nm to 410 nm and a recording light absorption amount per 0.30 mm of 25.0% or less (i.e., 20.8% or less per innermost depth t1d).

In the samples S11 to S15 and the comparative samples R3 and R4 having the recording light absorption amounts of 25.0% or less, irrespective of a distance from the interfacial surface between the substrate 102 and the recording layer 101 (20 µm to 250 µm), almost no difference in the recording times was confirmed. In contrast, in the comparative samples R1 and R2 having the recording light absorption amounts exceeding 25.0%, it was confirmed that the overall recording times are prolonged in accordance with the distance from the interfacial surface between the substrate 102 and the recording layer 101.

As described above, in the recording layer 101, the recording light absorption amount is 25.0% or less and the short-wavelength absorption change amount is 8.0% or more. Accordingly, the recording layer 101 can enhance the optical intensity of the recording light beams L2c at the focal point while suppressing the light absorption amount of the recording light beams L2c at a portion with a low optical intensity in the area other than the area in the vicinity of the focal point.

As a result, the recording layer 101 can fully exert an effect of increasing the light absorption amount accompanying a large short-wavelength absorption change amount and effectively absorb the recording light beams L2c so that the recording marks RM can be readily formed.

4. Operation and Effect

In the structure described above, in the recording layer 101 of the optical information recording medium 100, the mark layers Y are formed by arranging the recording marks RM formed in accordance with the recording light beams L2c as condensed recording light. In the recording layer 101, the recording light absorption amount as the light absorption amount per innermost depth t1d that is a depth down to the mark layer Y most distant from the side of the recording layer 101 that the recording light beams L2c enter (i.e., interfacial surface between substrate 102 and recording layer 101) is 20.8% or less. In the recording layer 101, the short-wavelength absorption change amount with respect to measurement light having a wavelength 10 nm shorter than that of the recording light beams L2c at a time the recording light absorption amount with respect to measurement light having the same wavelength as the recording light beams L2c (405 nm) is used as the reference is 8.0% or more per 0.30 mm.

The recording layer 101 forms the recording marks RM in accordance with the recording light beams L2c as blue-violet light beams within the range of 400 nm to 500 nm.

Accordingly, since a spot diameter can be reduced in the recording layer 101 as compared to a case of using red light beams having a wavelength larger than 500 nm as the recording light beams L2c, the recording light beams L2c can be effectively condensed so that the recording marks RM can be formed in a short period of time.

In the recording layer 101, the recording light absorption amount per innermost depth t1d is 20.8% or less, and there exists an absorption end for rapidly increasing the light absorption amount from the long-wavelength side to the short-wavelength side within the ranges of +5 nm and −20 nm from the wavelength of the recording light beams L2c.

Accordingly, since a change of the light absorption amount on the short-wavelength side slightly shorter than the wavelength of the recording light beams L2c can be made sharp, the absorption amount of the condensed recording light beams L2c can be increased to thus shorten the recording time.

With the structure described above, the light absorption amount of the recording layer 101 of the optical information recording medium 100 is measured using measurement light having an optical intensity far smaller than (e.g., ¹⁄₁₀ or less) the optical intensity of the recording light beams L2c irradiated onto the recording layer 101 in the vicinity of the focal point of the recording light beams L2c. At this time, in the recording layer 101, the recording light absorption amount with respect to measurement light having the same wavelength as the recording light beams L2c is 20.8% or less, and the short-wavelength light absorption amount with respect to measurement light having a wavelength 10 nm shorter than that of the recording light beams L2c is 8.0% or more per innermost depth t1d with respect to the recording light absorption amount.

Accordingly, the recording layer 101 can suppress the light absorption amount in the vicinity of the recording light beams L2c with a low optical intensity and condense the recording light beams L2c with a high optical intensity at the focal point, and thus effectively absorb the recording light beams L2c in the vicinity of the focal point. Thus, according to the embodiment of the present invention, an optical information recording medium capable of shortening a recording time can be produced.

5. Other Embodiments

It should be noted that the above embodiment has described the case where the recording marks RM are formed in the recording layer 101 by bubbles (i.e., cavities). However, the present invention is not limited thereto, and the recording marks RM may be formed by changing a refractive index in the vicinity of the focal point Fb by a chemical reaction corresponding to the recording light beams L2c. In short, it is only necessary to reflect the reading light beams L2d by the recording marks and generate return light beams L3 in a detectable light amount.

Moreover, the above embodiment has described the case where the presence/absence of the recording marks RM is detected by the return light beams L3 obtained as a result of reflecting the reading light beams L2d irradiated onto the recording marks RM by the recording marks RM. However, the present invention is not limited thereto, and it is also possible to detect the presence/absence of the recording marks RM by receiving transmitted light beams of the reading light beams L2d and detecting an increase and decrease of the light amount of the reading light beams L2d, for example.

Furthermore, the above embodiment has described the case where the liquid material M1 is constituted of the monomers and the photopolymerization initiator. However, the present invention is not limited thereto, and the constituent material of the liquid material M1 may be added with, for example, a heat-curable monomer, a curing agent for curing the heat-curable monomer, a binder polymer, a binder oligomer, a photopolymerization initiator, and a sensitizing dye as necessary. In short, the cured recording layer 101 only needs to contain a photopolymerization initiator.

It should be noted that examples of the binder component added as necessary, include compounds that can be used as a plasticizer, such as ethylene glycol, glycerin and a derivative thereof, polyalcohol, phthalate ester and a derivative thereof, naphthalene dicarboxylate ester and a derivative thereof, ester phosphate and a derivative thereof, and fatty acid diester and a derivative thereof. The photopolymerization initiator used at this time is desirably a compound that can be broken down as appropriate by post-processing after recording of information. Moreover, examples of the sensitizing dye include a cyanine-based dye, a coumarin-based dye, and a quinoline-based dye.

Furthermore, the above embodiment has described the case of measuring the light absorption amount at each wavelength from 350 nm to 800 nm using a spectrophotometer when measuring the heat absorption change amount and the light absorption change amount at 405 nm. However, the present invention is not limited thereto, and it is also possible to measure the recording light absorption amount and the short-wavelength light absorption amount by irradiating light of 405 nm and 395 nm with an optical intensity of 0.3 $\mu W/cm^2$, for example.

In addition, the above embodiment has described the case where the photopolymerization initiator and the cured resin contained in the recording layer absorb the recording light beams L2c to thus generate heat. However, the present invention is not limited thereto, and either the photopolymerization initiator or the cured resin may absorb the recording light beams L2c to thus generate heat, for example. Alternatively, it is also possible to increase the temperature in the vicinity of the focal point Fb by generating heat by a chemical reaction (e.g., optical or thermal chemical/breakdown reaction) caused by compounds other than the photopolymerization initiator, such as an additive that is added as necessary and a cured resin that are contained in the recording layer, in accordance with the recording light beams L2c.

Further, the above embodiment has described the case where the recording layer 101 is formed of a cured resin obtained by curing the light-curable resin. However, the present invention is not limited thereto, and the same effect as the above embodiment can be obtained even when a recording layer formed of, for example, a heat-curable resin contains a vaporizing material corresponding to a photopolymerization initiator residue that forms bubbles when vaporized and a chemical reaction is caused in the recording layer due to the initialization light L1.

Moreover, the above embodiment has described the case where the initialization light L1 as parallel light is irradiated onto the optical information recording medium 100 in the initialization processing (FIG. 2). However, the present invention is not limited thereto, and initialization light L1 as diffused light or convergent light may be irradiated onto the optical information recording medium 100.

Furthermore, the above embodiment has described the case where the wavelengths of the initialization light L1 for performing the initialization processing of the optical information recording medium 100, the recording light beams L2c for recording information onto the optical information recording medium 100, and the reading light beams L2d for reproducing information from the optical information recording medium 100 are set to be the same. However, the present invention is not limited thereto, and only the wavelength of the initialization light L1 may differ from those of the recording light beams L2c and the reading light beams L2d, or the wavelengths of the initialization light L1, the recording light beams L2c, and the reading light beams L2d may all differ, for example.

In this case, desirably, the initialization light L1 has a wavelength suited to a sensitivity of a photochemical reaction in the photopolymerization light-curable resin constituting the recording layer 101, the recording light beams L2c have a wavelength with which a temperature is increased by heat conduction of materials or a wavelength with which heat can be absorbed with ease, and the reading light beams L2d have a wavelength with which highest resolution can be obtained. At this time, the NA of the objective lens 13 (FIG. 6) and the like only needs to be adjusted as appropriate based on the wavelengths of the recording light beams L2c and the reading light beams L2d and the like. In addition, it is also possible to use two objective lenses optimized for the recording light beams L2c and the reading light beams L2d, respectively, while switching them at a time of recording and reproducing information.

Moreover, regarding the photopolymer constituting the recording layer 101, a component thereof and the like only needs to be adjusted as appropriate so that most-favorable characteristics can be obtained in combination with the wavelengths of the initialization light L1, the recording light beams L2c, and the reading light beams L2d.

Further, the above embodiment has described the case where the initialization light L1, the recording light beams L2c, and the reading light beams L2d are irradiated onto the surface of the optical information recording medium 100 on the substrate 102 side. However, the present invention is not limited thereto, and it is also possible to irradiate the light and light beams onto the surface on the substrate 103 side or irradiate the light and light beams onto both of the surfaces.

Furthermore, the above embodiment has described the case where the wavelength of the recording light beams L2c is 405 nm. However, the present invention is not limited thereto, and the wavelength of the recording light beams L2c is not particularly limited. The wavelength of the recording light beams L2c can be selected as appropriate based on the characteristics of the recording layer 101.

Moreover, the above embodiment has described the case where, by fixing the optical information recording medium 100 to the table 3 and displacing the optical pickup 7 in the x direction, the y direction, and the z direction, an arbitrary position of the recording layer 101 is set as a target position at which a recording mark RM is formed. However, the present invention is not limited thereto, and it is also possible to structure the optical information recording medium 100 as an optical information recording medium such as a CD and a DVD and record/reproduce information onto/from the medium by displacing the optical pickup 7 in the x direction, the y direction, and the z direction while rotatably driving the optical information recording medium, for example. In this case, it is only necessary to form groove-like or pit-like tracks on the interfacial surface between the substrate 102 and the recording layer 101 and perform tracking control, focus control, and the like, for example.

Further, the above embodiment has described the case where the recording layer 101 of the optical information recording medium 100 is formed in a shape of a disk that is 50 mm on a side and has a thickness t1 of about 0.05 mm to 1.2 mm. However, the present invention is not limited thereto, and the recording layer 101 may be formed to have other arbitrary dimensions or may take various other shapes such as a square plate, a rectangular plate, and a cube of various dimensions. In this case, it is desirable to set the thickness t1 in the z direction in view of a transmittance and the like of the recording light beams L2c and the reading light beams L2d.

Moreover, the above embodiment has described the case where the recording layer 101 is constituted of a single layer. However, the present invention is not limited thereto, and the recording layer 101 may be constituted of a plurality of layers. Moreover, when a desired intensity or the like can be obtained with the recording layer 101 alone, the substrates 102 and 103 may be omitted from the optical information recording medium 100.

In addition, the above embodiment has described the case where the plurality of mark layers Y are formed in the recording layer 101. However, the present invention is not limited thereto, and only one mark layer Y may be formed.

Furthermore, the above embodiment has described the case where the optical information recording medium 100 as the optical information recording medium is constituted of the recording layer 101 as the recording layer. However, the present invention is not limited thereto, and the optical information recording medium may be constituted of a recording layer of various other structures.

The present invention is also applicable to an optical information recording/reproducing apparatus and the like that records/reproduces large-size information such as a video content and an audio content onto/from a recording medium such as an optical information recording medium.

The present application contains subject matter related to that disclosed in Japanese Priority Patent Application JP 2009-009218 filed in the Japan Patent Office on Jan. 19, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical information recording medium, comprising a recording layer that includes a mark layer in which recording marks formed in accordance with condensed recording light are aligned, that has a recording light absorption amount of 20.8% or less with respect to an innermost depth, the innermost depth being a depth of the mark layer from a side thereof that recording light enters to a side thereof that is most distant from the side that the recording light enters, and that has a change amount of a light absorption amount with respect to measurement light having a wavelength 10 nm shorter than that of the recording light, at a time a light absorption amount with respect to measurement light having the same wavelength as the recording light is used as a reference, of 8.0% or more per 0.30 mm.

2. The optical information recording medium according to claim 1,
wherein the recording light is a blue-violet light beam.

3. The optical information recording medium according to claim 2,
wherein the recording marks formed in the recording layer are constituted of cavities.

4. The optical information recording medium according to claim 3,
wherein the recording layer contains a vaporizing material having a vaporization temperature of 140° C. or more and 400° C. or less.

5. The optical information recording medium according to claim 4,
wherein the mark layer is provided plurally in the recording layer.

6. The optical information recording medium according to claim 5,
wherein the recording layer has a thickness of 0.05 mm or more and 1.0 mm or less.

7. An optical information recording medium, comprising a recording layer that includes a mark layer in which recording marks formed in accordance with condensed recording light are aligned, that has a recording light absorption amount of 20.8% or less with respect to an innermost depth the innermost depth being a depth of the mark layer from a side thereof that recording light enters to a side thereof that is most distant from the side that the recording light enters, the recording layer having an absorption end for rapidly increasing a light absorption amount from a long-wavelength side to a short-wavelength side within ranges of +5 nm and −20 nm from a wavelength of the recording light.

8. The optical information recording medium according to claim 7,
wherein the recording layer includes the absorption end within ranges of +2 nm and −17 nm from the wavelength of the recording light.

* * * * *